United States Patent Office 2,829,517
Patented Apr. 8, 1958

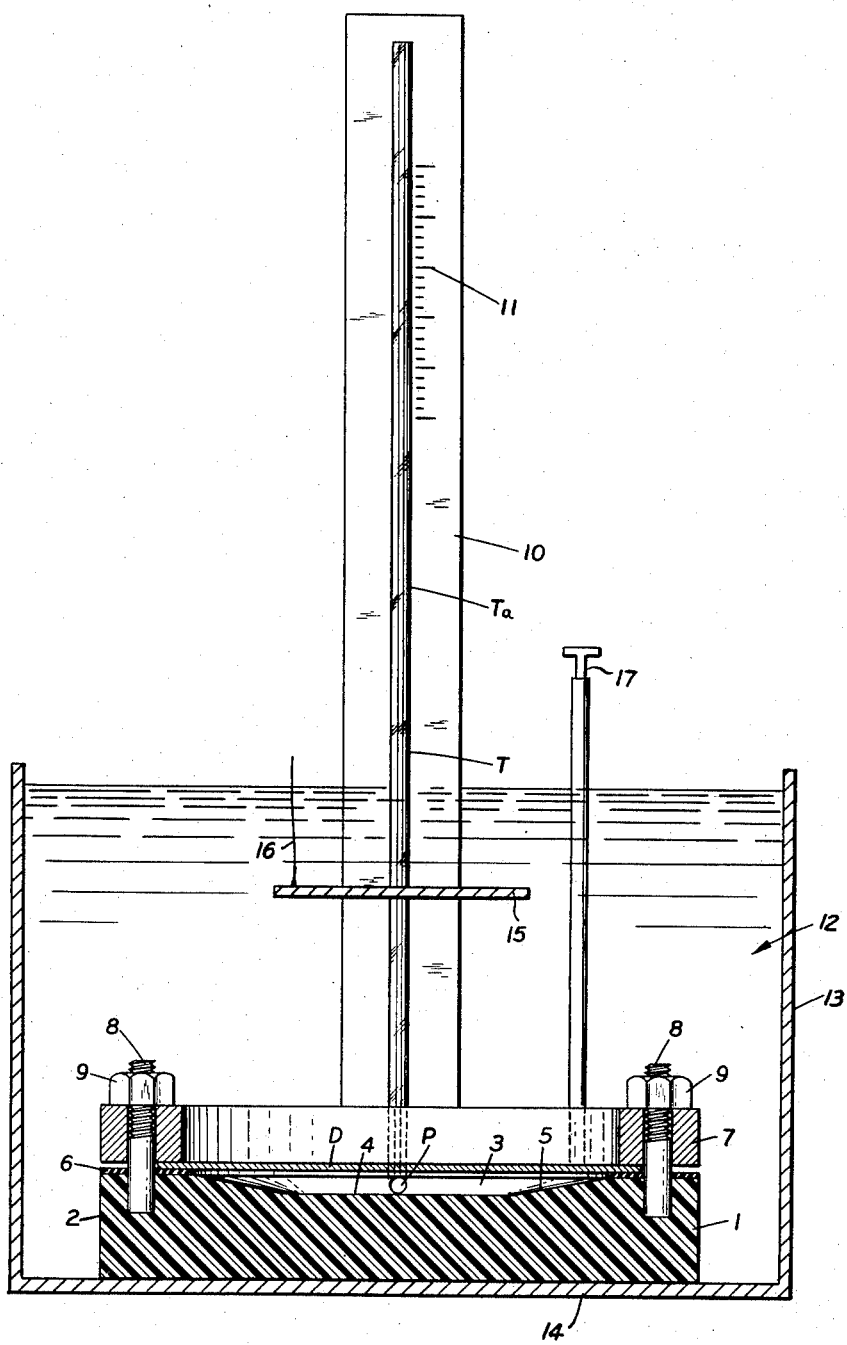

2,829,517

MEASURING STRESS IN AN ELECTRODEPOSIT OR OTHER COATING

Joseph B. Kushner, Stroudsburg, Pa.

Application January 6, 1954, Serial No. 402,466

3 Claims. (Cl. 73—150)

My invention relates particularly to measuring the stresses which are produced by coatings or deposits, such as coatings or deposits of paint, lacquer, electrodeposited metal, etc.

When a film or coating of many materials is deposited upon a face of a body, such film or coating either contracts or extends the face upon which said coating or film is deposited. The force which is thus exerted is a lateral force which is parallel to said film or coating.

If the lateral force is a contractile force, and the face has an original planar shape, such lateral force tends to change said original planar shape to a concave shape. I designate such lateral contractile force as a positive force.

If the lateral force is a stretching force, such original planar shape is changed into a convex shape. I designate this lateral force as a negative force or minus force.

If the coating is zinc, such coating produces a negative lateral force.

By applying either said force to one face of a flexible planar disc, such disc is arched.

According to my invention, I can accurately measure such lateral forces, in a range of minus 200,000 pounds per square inch to plus 200,000 pounds per square inch.

The invention relates particularly to measuring the lateral stresses which are produced by thin coating layers or films.

Thus, it may be used for measuring the slight lateral stress which is produced by a coating layer of paint, lacquer, plastics and metal.

Without limitation thereto, but as a special and important feature of my invention, it relates to measuring the lateral stress which is produced by a coating layer of metal, which may be electrodeposited or deposited or formed by any method, such as chemical deposition, by spraying with molten metal as in the well-known process, etc.

It has been known for a long time that stresses which are produced by a coating film or layer of electrodeposited metal can result in non-adhesion and peeling of the coating (Gore, "The Art of Electrometallurgy," published in 1858; R. S. Mills, "Proceedings Royal Society," Series A, Electrochem. Soc., vol. 3, page 255, published in 1903).

In electroforming, parts are manufactured to close tolerances by electroplating. A stress in the electrodeposit may cause serious distortion in the finished article when said article is removed from the former (A. S. Kasdan, "Annual Proc. American Electroplaters Soc.," vol. 115, published in 1947). Similarly, if an object is plated with a metal for increasing resistance to wear or to prevent corrosion, said object may be subjected to considerable flexure because of the stress of the plated metal deposit.

It has been shown that electrodeposited films or layers of metal which develop high internal stresses may result in rapid corrosion (F. Speller, "Trans. Amer. Electrochem. Soc.," 1929, page 41; Read & Thomson, "Proc. Amer. Electroplaters Soc.," 1948, page 79).

Hence the need of a simple and accurate device for measuring said internal stress has been recognized for many years.

In one prior device, the bulb of an ordinary mercury thermometer has been silvered chemically and then plated with another metal (R. S. Mills, supra). Some metallic coatings exerted a compressure force on the bulb, and other coatings exerted an expansive force, as indicated by the rise or fall of the mercury column. The Mills method has never been practically used.

A second method has been based upon the flexure of a thin metal strip (G. G. Stoney, "Proceedings Royal Society," series A, vol. 82, page 172, published in 1909). This method has been the basis of all later methods which have been used, with the exception of an X-ray method. Stoney plated one face of a thin flat steel strip with various thicknesses of nickel, and he found that the electro-plated strip was arched.

Stoney's method has been applied to an instrument which is known as a contractometer (Kohlschutter & Vuillemier, "Z. Electrochemie," vol. 24, page 300, published in 1908). This instrument consists of a thin platinum strip to which a pointer is fixed. The bending of the plated metal strip by an electrodeposited film or layer of metal is measured by a scale (Vuillemier, "Trans. Amer. Electrochem. Soc.," vol. 42, page 99, published in 1922). The true stress, as measured by this contractometer, cannot be computed except with considerable mathematical difficulty.

Other methods have used a double strip (Macnaughton & Hothersall, "Trans. Faraday Soc.," vol. 24, page 387, published in 1928; by measuring residual stress, Gardam, "J. Electrodepositors Tech. Soc.," vol. 15, page 127, published in 1935; Hothersall, "Institute of Metals," page 107, published in 1948; the use of a shadograph (Gardam, supra), coiling the metal strip into a spiral or helix to produce a spiral contractometer (Brenner et al., "Proceedings American Electroplaters Soc.," 1948, page 53; 1947, page 32; 1952, pages 39 and 865).

All the methods which have been found practical, beginning in 1909, have depended upon the flexure of a thin metal strip. The Kohlschutter-Vuillemier contractometer is extremely fragile, and its results are difficult to interpret in terms of absolute values. All these methods, with the exception of the Brenner method which is embodied in the spiral contractometer, have required the use of a sensitive gauge or a microscope to measure the very small deflections.

The Brenner method and device involve considerable time and work. Twenty different steps must be taken before a stress determination can be made. Considerable time is required to prepare the stainless steel helix and to cover its inner face with insulating paint. The material of the steel helix is thin, about 0.01 inch. The steel helix is fragile and must be carefully handled, and it must be wound upon a rod of 0.75 inch diameter in order that its constants be determined. The needle which indicates the angle of twist continually binds. This binding must be released by tapping, which can cause excess motion of the needle.

According to my invention, I provide a simple and accurate method, and a measuring instrument which is simple and can be made at low cost.

In my invention, I provide as one example, a thin and flexible test disc of suitable metal or alloy or other material, which is resilient or elastic. This test disc is of substantially uniform thickness and it has an original and normal substantially planar shape. This disc can be easily flexed, in order to deform said test disc from its original normal planar shape to an arched or bowed shape.

If a test disc is used, said test disc is held clamped or fixed at an annular peripheral edge-part thereof, thus providing a central unclamped and disc-shaped and imperforate coating zone of said disc. This coating zone is coated at one face thereof with the metal or other material whose lateral stress is to be tested. The entire disc is an example of a flexible member, which has resilience or elasticity. The important feature is to provide a disc-shaped and imperforate coating zone, which is free to flex upwardly and downwardly relative to a fixed or substantially fixed or relatively fixed edge-part of the flexible disc or other member. The shape of this edge-part may be varied, so that it need not be annular. However, it is highly desirable to provide a disc-shaped flexible member, and to clamp an annular part of said disc-shaped annular member which is concentric with the center of the disc, thus providing an imperforate and disc-shaped coating zone which is concentric with the disc. Said unclamped and bendable coating zone is preferably coated to provide a coating of uniform thickness on the entire area of one face of said coating zone. However, the coating may be applied to only a part of said area, as long as the coating is disc-shaped and substantially concentric with the center of the disc-shaped zone which is free to flex transversely relative to an edge-part of the flexible test member.

In the embodiment described herein, which is highly preferred, but to which the invention is not limited, the flexible test member is a metal disc which is made of copper or steel; this is clamped at an annular edge-part which is concentric with the center of the disc, and the coating is applied to the entire area of one face of the unclamped part of the disc, so that the coating is disc-shaped and concentric with the center of the disc.

The instrument comprises a stress-measuring chamber, which is open at one face thereof, and which has a side-port between its top and bottom. This side-port communicates with a stress-indicating tube of fine cylindrical bore.

This chamber is completely filled with a body of an indicating liquid, such as water or ethanol, which is incompressible and free from air bubbles and dissolved air. This body of liquid is continuous with a vein of said liquid which is in a part of said tube.

The annular peripheral edge-part of said disc is clamped to the edge-wall of said chamber at said open face of said chamber. When said disc is in its original and normal and planar or substantially planar shape, the inner face of the unclamped part of said disc contacts with the liquid, and the pressure chamber is free from gas.

Hence a slight inward flexure of the unclamped part of said disc will displace liquid by direct pressure on the liquid, from said chamber into said tube, thus increasing the height of the column of liquid in said tube. Thus, if nickel is electro-plated upon the outer or exposed face of said unclamped portion, and said disc is made of copper or steel, said unclamped portion will be deflected inwardly into the chamber, thus increasing the length or height of the column of liquid in the tube. Said column has a branch which is held vertical in the test, in this embodiment, so that the indicating liquid is subject to the force of gravity.

If zinc is plated upon said outer or exposed face of said unclamped portion of a copper or steel disc, said disc will be flexed outwardly, thus increasing the volume of the chamber and decreasing the length or height of the column or vein of liquid in the tube.

Hence the test includes an increase or decrease of the volume of the chamber.

The maximum deflection of the disc is at its center.

Under the conditions of the test, the change in length or height of the column or vein of the liquid in the tube, has a linear relation to the maximum deflection of the disc at its center.

Also, the increase or decrease of the pressure on the filling body of liquid in the chamber, and the increase or decrease of the volume of said chamber, has said linear relation. A vertical column of liquid in said tube is a delicate and sensitive measure of the change of pressure in the chamber or the change of volume of said chamber, but other means can be used for measuring said change in pressure or volume. The chamber is always filled with the liquid and it is free from gas or substantially free from gas, when the volume of the chamber is increased or decreased, in order to prevent or minimize any error which may result from the compression or expansion of a gas.

Under the conditions stated herein, there is a high ratio between the change in length of the column or vein of liquid in the tube, and the maximum deflection at the center of the disc. This provides a large and accurate measure of said maximum reflection, so that it is not necessary to use a delicate gauge or microscope.

The invention is further explained in the annexed description and drawing.

The drawing is a vertical section, partially in elevation.

The specific disclosure herein is of an actual practical embodiment, but the invention is not limited to the dimensions, relative proportions, and other details of said practical embodiment.

Also, it is well-known, as in the Schoop process, to deposit a film or layer of metal by spraying the molten metal upon a conductive or non-conductive object, and the invention can be used to measure the stresses of such films or layers.

The device comprises a rigid vessel 1. This may be made of rigid methyl methacrylate resin material. This material is inert, transparent, colorless, and a non-conductor of electricity. Other materials may be used, whenever this resin is mentioned.

This vessel has a vertical cylindrical wall 2. The diameter of wall 2 is 5 inches.

Vessel 1 has a top depression or recess or chamber 3, whose volume is 1.2 cubic inches.

Recess 3 has a horizontal disc-shaped bottom wall 4, and a frusto-conical edge wall 5.

The annular top of the edge wall of vessel 1 is flat and in the same plane.

A ring-shaped washer or packing ring 6 is located on the flat annular top of the edge-wall of vessel 1. This packing ring 6 may be made of synthetic rubber which is inert, resilient, compressible, and a non-conductor of electricity. Other materials may be used. Ring 6 has an inner diameter of 3.5 inches and an outer diameter of 5 inches.

This embodiment uses a flexible metal disc D, which may be made of copper, brass, steel, stainless steel, etc., which is readily plated with nickel, which is the coating in this embodiment. This disc D has a normal planar shape.

The diameter of disc D is 4 inches. It is of uniform small thickness, in a range of 0.02 inch to 0.05 inch. The wall 4 of the chamber 3 has a transverse horizontal outlet or port P, to which one end of a tube T is fixed. This tube T is of angular shape. It has a transverse horizontal leg whose length is 1.2 inches, and a vertical leg Ta whose height is 18 inches. This tube T has an outer diameter of 0.375 inch. The chamber 3 and the lower part of the vertical leg of tube T are filled with an air-free filling of water, ethanol, or other suitable liquid. When chamber 3 has its normal volume, in which the disc D is planar, the liquid in chamber 3 contacts with the inner face of disc D and the height of the liquid in the vertical leg Ta of tube T is 1 to 17 inches.

A narrow angular peripheral portion of disc D, whose width is 0.25 inch, is clamped rigidly against this packing ring 6 and the planar top edge-wall of vessel 1, by a clamping ring 7, bolts 8 and nuts 9, which are made of resin, plastic or any material. The lower end of bolts 8 are fixed in recesses of the edge-wall of vessel 1. A bar 10, made of said any material, is fixed to vessel 1 at its edge-wall. A scale 11 is applied to bar 10. The tube T is fixed to vessel 1.

The entire assembly for clamping the disc D is immersed in a bath 12 of plating solution disposed in a container 13; with the bottom edge of vessel 1 resting on the bottom 14 of the container 13. An anode is suitably supported above the disc D generally centrally of the container 13 and may be connected to the positive terminal of a source of voltage (not illustrated) via a lead 16. The disc D constitutes the cathode of the plating apparatus and is connected via a copper rod 17 to the negative terminal of the plating voltage source. The rod 17 is screw threaded into the ring 7 and presses against the disc D. The copper rod 17 is insulated from the plating solution 12 by means of an insulating sleeve or tube 18 which surrounds the rod 17 except at its ends.

During the test, the disc D is maintained planar and horizontal, subject to the slight flexure of its unclamped central part. In the tests reported herein, the indicating liquid was water, and when the disc D had its original and normal planar shape, the height of the vertical column of liquid in the vertical leg of tube T was one inch or more above the planar top of the filling body of liquid in chamber 3, depending on whether the stress to be measured is tensile or compressive. This height may be one to eleven inches.

In these tests, the entire area of the top face of the unclamped part of disc D was coated with the electrodeposit of nickel, so that the coating was disc-shaped and it had a radius of 1.75 inches.

In these tests, the vessel 1 and disc D were submerged in the plating bath, which exerted a uniform pressure on the unclamped part of disc D, which was maintained in horizontal position, subject to slight deflection from original planar shape by the pressure of the plating bath. In one test, the top face of disc D was 4.45 inches below the top of the plating bath. When the instrument was thus submerged, the height of the vertical column of liquid, above the top of the pool of the indicating liquid in chamber 3, was 9.32 inches.

In this test, the coating of nickel downwardly arched or bowed the unclamped part of disc D, decreasing the original volume of chamber 3 and increasing the height of the vertical liquid column in the vertical leg Ta. As above noted, other coating materials may reversely arch or bow said unclamped part, thus increasing the original volume of chamber 3 and decreasing the height of the liquid column in the vertical leg Ta.

If a metal is to be electrically deposited upon the exposed outer plating zone of disc D, the bare ends of suitable conductors, not shown, are clamped to the top of the annular clamped part of disc D. These bare ends will be located preferably between the top face of said annular clamped part of disc D and the clamping ring 7. The other ends of said conductors are connceted to the negative terminal of the source of plating current. The parts of said conductors which are immersed in the plating bath are insulated. An anode is located in the plating bath above the disc D; and this anode is connected to the positive terminal. The usual conditions are used, in order to get uniform plating upon the top of the unclamped part of disc D. If the metal or other material is deposited chemically or by any other method, these conductors can be omitted.

*Theory of instrument*

If the exposed top plating zone of the resilient or elastic disc D is plated, as with nickel, to form a disc-shaped electrodeposit which is concentric with the disc D, the plating zone of disc D, which has an original and normal planar shape, will be deflected or deformed downwardly to an arched or bowed shape by the stress of said nickel deposit. Said downward deformation of the plating zone of disc D, relative to its clamped edge, under the stress of the electrodeposit, will exert pressure on the liquid in the space or recess 3, thus raising the level of the column of liquid in the bore of vertical leg Ta of Tube T.

The following symbols are used herein:

"S" is the stress of the electrodeposit or other deposit; in pounds per square inch.

"L" is the rise of the liquid in leg Ta of tube T, measured in inches.

"d" is the original thickness of the test metal disc D.

"t" is the thickness of the metal electrodeposit.

"A" is the radius of the plating zone of the metal disc D.

"E" is Young's modulus for the metal or other material of disc D.

"Z" is the vertical deflection of the center of disc D, measured in inches.

"r" is the radius of the uniform bore of tube T.

"V" is the change in volume of the liquid in the chamber or recess 3, which is produced by the flexure of the plating zone of disc D.

As above disclosed, the outer diameter of disc D is much greater than its thickness. The thickness $t$ of the electrodeposited metal preferably is much smaller than the thickness of disc D.

It can be mathematically demonstrated that the change in volume "V" of the liquid in chamber or recess 3, which results from the downward or upward arching of the plating zone of disc D under the stress, is equal, for small vertical deflections of the center of disc D, to two-thirds the volume of a spherical segment whose radius is A, and whose height is Z.

The volume VA of a segment of a sphere, the height of said spherical segment being Z and the radius of said spherical segment being A is, (1) $$VA = \frac{\pi Z}{6}(Z^2 + 3A^2)$$

When the height Z is very small compared to the radius A, as in the instant case, (2) $$VA = \frac{\pi Z A^2}{2}$$

When a planar disc is deflected according to this invention, the change of volume of recess 3 is two-thirds of the above, namely (3) $$V = \frac{\pi Z A^2}{3}$$

When the original volume of recess 3 is decreased by "V," the volume V of the liquid which is forced into the indicating tube T is $\pi r^2 L$.

Hence (4) $$\pi r^2 L = \frac{\pi Z A^2}{3}$$

and (5) $$L = \frac{Z A^2}{3 r^2}$$

Hence, the increase in height L of the indicating liquid in the bore of the indicating tube T, will vary directly with Z, namely, the deflection at the center of disc D.

There is a very large ratio in Equation No. 5, namely (6) $$\frac{A^2}{r^2}$$

Hence, this very large ratio provides a very large magnification factor, which provides a very sensitive device and method.

As one example, the transverse deflection at the center of the disc D is 0.001 inch. The disc D is plated or otherwise coated in a disc-shaped area whose radius is 1.75 inches, which is the radius A. The radius of the capillary bore of tube T is 0.05 inch.

In such case, $Z = 0.001$ inch
$A^2 = 3.06$
$r^2 = .0025$

In such case, $L = 0.41$, so that the deflection Z of 0.001 inch at the center of the coated area, has been magnified 410 times by the increase L.

In another actual model, the accurate capillary bore had an internal radius of 0.026 inch which gave a magnification of $$\frac{3.06}{3 \text{ times } 0.00676} = 1510 \text{ times}$$

Such high magnification makes it possible to measure slight stresses, such as those produced by a film of paint, lacquer, and for testing thin sheets of plastics and other materials.

In the following discussion,

"$q$" is the uniform load which is applied to the unclamped part of disc D, in order to flex said unclamped part of disc D. Said flexing is in a transverse downward direction in this embodiment but it may be transversely upward. This load is measured in pounds per square inch.

Under such load, the deflection at the center of the disc D is designated as Z.

(7) $$Z = \frac{kqA^4}{Ed^3}$$

"$k$" is a constant, which depends upon the type of support at the edge of the disc D.

If the disc D is supported at its edge, as shown in Fig. 1, in which the edge of disc D is clamped rigidly, a uniform bending moment is applied to the unclamped part of disc D under load "$q$."

This bending moment is (8) $$\frac{qA^2}{8}$$

In order to produce the same bending moment as in Equation No. 8, by the lateral stress "$s$,"

(9) $$\frac{Sdt}{2} = \frac{qA^2}{8}$$

Hence,

(10) $$q = \frac{4Sdt}{A^2}$$

Equation No. 10 therefore defines the lateral stress which is produced by plating or otherwise depositing the stress producing layer on the disc D, to produce the same deflection as under load "$q$."

Hence, substituting this value of "$q$" in Equation No. 7,

(11) $$Z = \frac{4kSA^2t}{Ed^2}$$

This proves that the deflection Z at the center of disc D will vary directly as the lateral stress S which is produced by the metal electrodeposit or other deposit.

Also, by reference to Equation No. 5,

(12) $$S = \frac{3r^2Ed^2L}{4kA^4t}$$

Hence, for a given set of conditions, "S" will vary with the change in length "L" of the liquid column in the bore of tube T, and inversely with the thickness "$t$" of the deposited metal or other deposited stress-producing material. This applies if the stress-producing deposit upwardly flexes the unclamped part of disc D, in which case the height of the column of liquid in tube T will be decreased.

*Calibration of disc D for the disc constant*

From Equation No. 7, it is clear that the deflection at the center Z, equals

(13) $$Rq$$

in which $$R = \frac{kA^4}{Ed^3}$$

for a given test under a given load "$q$."

Also,

(14) $$Z = KL$$

where "K" is another constant.

Hence

(15) $$L = \frac{R}{K}q$$

$$\frac{R}{K}$$

is designated as "N," which is another constant.

Hence,

(16) $$N = \frac{L}{q}$$

In terms of the constant "N," the stress will be given by

(17) $$S = \frac{A^2L}{4Ndt}$$

Hence, a known calibration load can be put upon the entire area of the top face of the unclamped part of disc D. This load is uniform. This calibration load may be a weight or it may be a vertical column of liquid, such as a vertical column of the liquid of the electroplating bath. This calibration load is uniform per unit of area, and it is measured in pounds per square inch. This calibration load results in an increase in length L of the height of the liquid column in tube T.

By means of such calibration load, "N" is determined by dividing L by the value of the calibration load, which is calculated in pounds per square inch.

Similarly, if the disc D is subjected to a known partial vacuum, in order to apply a calibration force which upwardly flexes the unclamped part of disc D and thus increases the volume of chamber 3, "N" can be calculated in the same manner, in which L is the decrease in height of the liquid column in tube T.

As above noted, the calibration force may be provided by the plating bath or solution, as by immersing the instrument in the plating bath to a measured depth, and determining the density of the plating solution. This will subject the unclamped part of disc D to a uniform pressure per square inch. As above noted, the disc D is located horizontally in said bath during the plating, and its unclamped part, due to the slight deflection at its center, remains substantially horizontal and planar during the plating.

In making a test, the disc D is cleaned and dried. The dry disc D is weighed. It is unnecessary to weigh the disc, if it is plated during the test with a known current for a known time at a known cathode efficiency, so that the weight of the electrodeposit can be thus calculated.

The parts of the instrument are assembled, and the instrument is submerged in the plating solution, so that disc D has the plating solution above it to a selected depth, such as 4.45 inches. The pressure of the plating solution will produce an elevation of the liquid in the tube T. Ordinarily this elevation is about 1.5 inches.

As above noted, the disc D is horizontally located and it remains substantially horizontal during the plating, so that its unclamped part is subjected to uniform and equal pressure during the plating.

The tank which holds the electroplating solution is optionally made of non-conductive material.

The negative terminal of the source of plating current is connected to the disc D in any suitable manner at the clamped edge-part of disc D.

The positive terminal of the source of plating current, which is unidirectional, is connected to a metal anode, which is located in the bath above disc D. Thus, if a nickel plating is to be formed, the anode is made of nickel. Any anode can be used, depending upon the bath.

The temperature of the bath is noted, and the circuit of the electroplating current is closed.

The rise or fall L of the liquid in the tube T can be noted at regular intervals, or it may be noted when the electroplating is discontinued at the end of a given time. The electroplating current preferably should be constant during the test, but this is not required if the deposit is to be weighed or if the thickness of the deposit can be determined by any accurate method.

After the electrodeposition has been completed, the instrument is removed from the bath, and the plated disc D, which has been plated at the entire exposed plating zone of its top face in this example, is removed and rinsed.

The disc D is dried and weighed, in order to determine the weight of the deposited metal. This weighing is not necessary, if a plating current of known value and of known cathode efficiency is used.

The stress of the deposited metal is then computed as above disclosed.

If the thickness of the deposit can be measured, as by using a precise instrument for this purpose, it is not necessary to determine the weight of the deposit.

Minor factors, such as difference in temperature between the liquid in chamber 3 and the plating bath, differences of temperature between the inner and outer faces of disc D, difference in thermal expansion between disc D and its coating of metal, are or can be made negligible.

If a coating of paint, lacquer, plastic etc. is to be tested, the disc D is calibrated to determine "N," and the coating is applied to the unclamped part of the dry disc D and the coating is dried or tested in the wet state. The weight of the coating is determined. The thickness of the coating can be measured. The coating is of uniform thickness, and if it is of known specific gravity and weight, its thickness can be determined without measuring it.

Tests have shown that electrodeposits of substantially uniform thickness are produced. Thus, in one test, the thickness of disc D was 0.020 inch, with a variation in thickness of 0.001 inch.

The deposited metal in this test was nickel. In this test, in which nickel was deposited, a constant current of two amperes was used during this test for 20 minutes. The thickness of the nickel deposit was substantially 0.00081 inch, with a variation of less than 2.2% of this value at any point of the plated surface. A standard Watt's nickel plating bath and a nickel anode were used.

Tests have been made with discs D of different thicknesses. These were plated with substantially identical thicknesses of nickel. These test discs D were made of steel and copper. The maximum deviation in the thickness of the nickel deposit was one percent. The thickness of the nickel deposit was 0.00052 inch in these tests. The temperature of the plating bath was in a range of 21° C. to 25° C.

Tests have been made to compare the accuracy of the new instrument with the spiral contractometer. There was a difference of 3% in the results, when the thickness of the nickel plating was 0.00017 inch in one case and 0.00045 inch in another case.

Additional tests have been made by electroplating nickel on various test discs. The diameter of these test discs was 4 inches. The diameter of the unclamped plating are or zone of the discs was 3.5 inches.

These tests are reported as follows:

| (1) | (2) | (3) | (4) |
|---|---|---|---|
| steel | .0260 | .00052 | $24.7 \times 10^3$ |
| copper | .0380 | .00052 | $25.1 \times 10^3$ |
| Do | .0385 | .00052 | $25.0 \times 10^3$ |
| steel | .0261 | .00052 | $25.0 \times 10^3$ |

Column No. 2 states the thickness of the disc in inches.

Column No. 3 states the thickness of the deposit in inches.

Column No. 4 states the calculated stress in pounds per square inch.

These tests were made while the plating baths were at respective temperatures of 21° C., 23° C., 25° C. and 22.6° C., in the vertical order stated in the above table.

The calculated stress was approximately 25,000 pounds per square inch.

These tests showed substantially uniform results in calculating the stress, with a maximum variation in the results of only one per cent, which is well within the range of experimental error, which is about 5%.

If the coating is nickel, this nickel coating tends to contract the upper face of disc D, by a lateral force of approximately 25,000 pounds per square inch, in the above example. This lateral contracting force is exerted in a direction parallel to the top surface of disc D, thus resulting in the downward arching or deflection of the unclamped part of disc D. I designate this as a positive stress.

If the coating is zinc, this exerts a stretching lateral force on the top face of disc D, thus upwardly arching the unclamped part of disc D. This lateral stretching force is also exerted in a direction parallel to the top surface of disc D. I designate this as a negative stress.

Without limitation thereto, and as one example, the improved method can be used to measure stresses in a range of minus 25,000 pounds per square inch, to plus 25,000 pounds.

As above noted, the stress is designated as a negative stress if the volume of the indicating chamber 3 is increased.

In some cases, the stress of the metal deposit will be zero and this can be determined. Thus, if a purified Watt's bath is used, and saccharin is added thereto, the stress of the nickel electrodeposit can be substantially zero.

The instrument and method can be used for measuring high stresses, such as stresses in a range of minus 200,000 pounds per square inch to plus 200,000 pounds per square inch.

Thus, in one test, hydrogen peroxide was added to a standard Watt's nickel-plating bath, and the resultant stress of a nickel deposit whose thickness was substantially 0.0001 inch, was plus 200,000 pounds per square inch.

When a metal disc is used, the maximum transverse deformation at the center of the disc may be substantially 0.003 inch. This will vary with the thickness of the disc and other factors, and said deflection may be up to 0.01 inch to 0.02 inch.

The ratio of L to Z is preferably at least ten.

The coating may be applied to any selected part of the area of a face of the flexure zone of disc D. This selected part is preferably concentric with the center of the flexure zone of disc D, and said selected part is preferably disc-shaped.

I claim:

1. A method of measuring the force which is produced by an electrodeposited layer of metal on a thin conductive flexible member which comprises the steps of clamping the periphery of the flexible member over one end of a cavity formed in a holder, filling the cavity with an indicating liquid which is continuous with a vein of indicating liquid, immersing the flexible member in a plating bath, the plating bath initially transversely deforming the unclamped zone of the flexible member, connecting the flexible member as the cathode of an electrodeposition circuit, activating the circuit to deposit a thin uniform coating of metal on the unclamped zone of the surface of the flexible member remote from the cavity in the holder, the coating producing a force which transversely deforms the flexible member, the coating being of such a thickness that the maximum deformation of the members is small relative to the dimensions of the unclamped zone, the deformation of the member changing the volume of the liquid in the cavity and therefore the length of the vein of liquid, the diameter "$r$" of the vein and the maximum deformation "$Z$" of the member the radius "$A$" of the coating being such that the change of length "$L$" of the vein of liquid conforms to the relationship, $$L = \frac{ZA^2}{3r^2}$$

2. The method of measuring the force produced by coating a planar disc-shaped element, comprising the steps of clamping the periphery of the element in a holder over one end of a cavity formed therein, filling the cavity with an indicating liquid which is continuous with a vein of said indicating liquid, producing a coating of substantially uniform thickness on all of or a predetermined portion of an unclamped zone of the surface of the element external of the cavity, the coating producing a force which transversely deforms the element, to change the pressure on the indicating liquid and consequently the length of the vein of liquid and measuring the change of length of the vein as a measure of the force produced by the coating.

3. A method according to claim 2, in which said force is applied by said coating on only a selected part of the area of a face of said zone, said part of said area being concentric with the center of said zone.

References Cited in the file of this patent

UNITED STATES PATENTS

| | | |
|---|---|---|
| 358,056 | Mullen | Feb. 22, 1887 |
| 911,277 | Smith | Feb. 2, 1909 |
| 1,377,220 | Nye | May 10, 1921 |
| 1,670,981 | Perkins | May 22, 1928 |
| 1,772,188 | Mason | Aug. 5, 1930 |
| 1,985,332 | Ward | Dec. 25, 1934 |
| 2,568,713 | Brenner | Sept. 25, 1951 |